Figure 1:
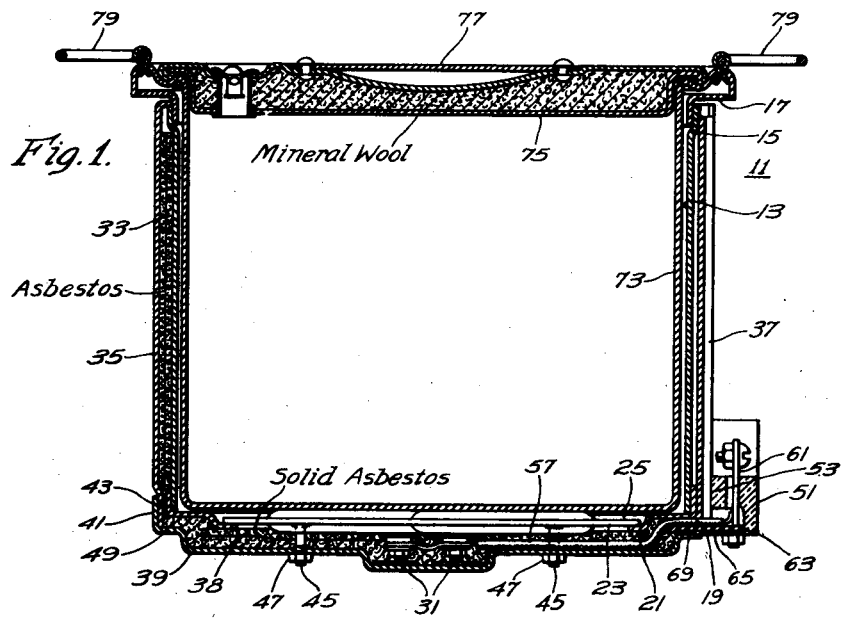

Feb. 23, 1937. A. BARNSTEINER 2,071,810
COOKING APPLIANCE
Filed Feb. 28, 1935 2 Sheets-Sheet 1

WITNESSES:

INVENTOR
Alfons Barnsteiner.
BY
ATTORNEY

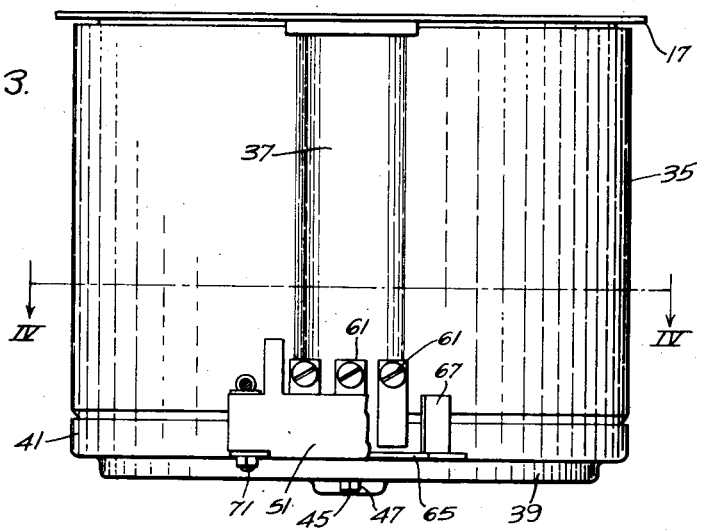
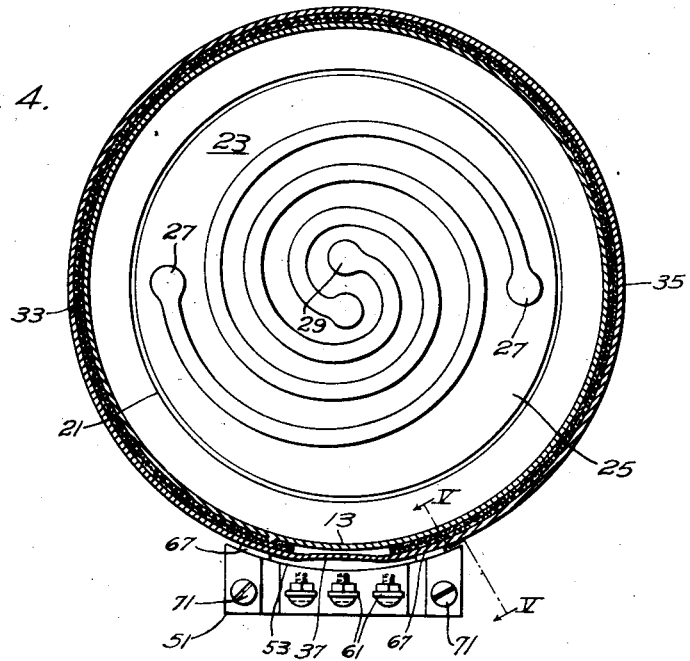
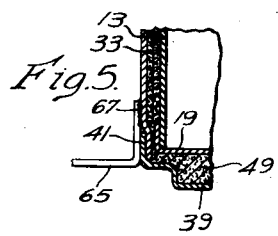

Patented Feb. 23, 1937

2,071,810

UNITED STATES PATENT OFFICE 2,071,810

COOKING APPLIANCE

Alfons Barnsteiner, Mansfield, Ohio, assignor to Westinghouse Electric & Manufacturing Company, East Pittsburgh, Pa., a corporation of Pennsylvania Application February 28, 1935, Serial No. 8,674

4 Claims. (Cl. 219—35)

My invention relates to electrically heated devices and particularly to electric cooking appliances.

An object of my invention is to provide a relatively simple, compact and easily assembled heat-insulated cooking appliance.

Another object of my invention is to provide an electric cooking appliance embodying a substantially flat heating element and a bottom cover member having interfitting parts to hold them in proper relative operative positions in the appliance.

Another object of my invention is to provide a relatively simple and efficient terminal support for an electric cooking appliance.

Other objects of my invention will either be apparent from a description of one form of device embodying my invention or will be pointed out in the course of such description.

In practicing my invention, I provide an inner thin-metal casing having an open top and bottom, a top ring of L-shape in radial section, for the inner casing and a bottom ring, also of substantially L-shape in radial section, for the inner casing having a depressed annular shoulder in the inwardly extending flange portion thereof. A substantially flat electric heating element is supported by the bottom ring in the depressed shoulder and has one or more bolts or studs secured thereto and depending therefrom and extending through a bottom cover plate, heat insulating material being located therebetween. Nuts may be applied to the bolts or studs to yieldingly draw the heating element and the bottom cover plate toward each other and to hold them tightly in their proper operative positions. A terminal-supporting structure is supported adjacent the bottom edge by a radially extending strip of thin metal having lugs extending parallel with and secured to an outside casing which is made of relatively thin metal so shaped as to be resilient. A layer of heat-insulating material is located between the peripheral walls of the inner and of the outer casing and is held in its proper operative position by the resilient outer casing.

Figure 2:
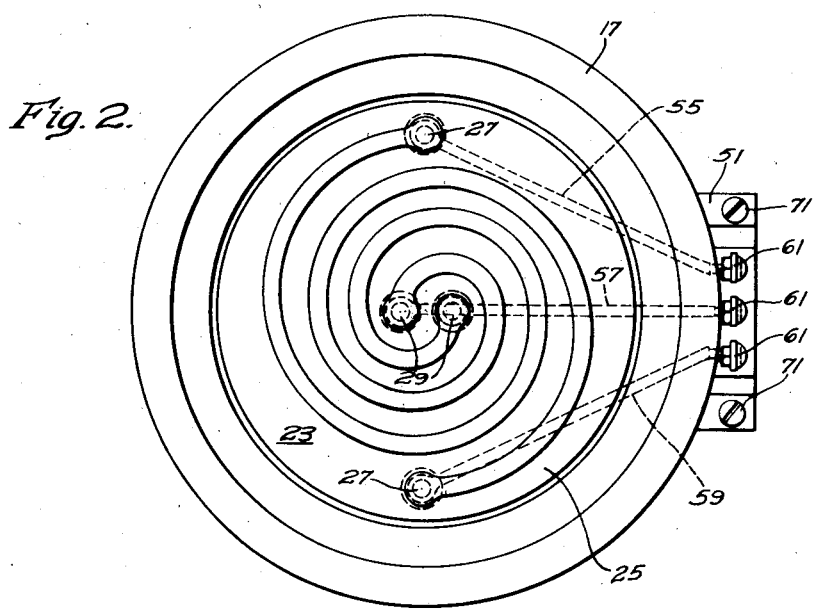

In the drawings,

Figure 1 is a view in vertical section, through a device embodying my invention, Fig. 2 is a top plan view of the structure shown in Fig. 1 of the drawings but with the cooking pot proper and its cover omitted, Fig. 3 is a view in side elevation of the parts shown in Fig. 2, Fig. 4 is a view in horizontal section through the parts shown in Fig. 3 and taken on the line IV—IV thereof, and Fig. 5 is a fragmentary enlarged view in vertical section taken on the line V—V of Fig. 4.

I have elected to show my invention in a particular embodiment of the type which may be called "Dutch oven"; that is, one which while being provided with an electric heating element is also provided with heat-insulating material in order to conserve the heat and which may also be operatively associated with the stove top of an electric range. I have not illustrated the details of the range, since it is obvious that my invention is not limited to such use alone and has other fields of general usefulness.

A cooking appliance 11 includes more particularly an inner casing 13 which has an open top and an open bottom and which, as shown in the drawings, is of substantially circular contour. At its upper end, the inner casing 13 is provided with a slightly enlarged portion 15, a top ring 17 of substantially L-shape in radial section being adapted to be associated therewith. The vertically depending flange of ring 17 is adapted to fit tightly within the enlarged portion 15 which is, therefore, made only so much larger as will accommodate the depending flange, while the bottom face of the horizontal flange of member 17 and the top edge of the inner casing are located in substantially the same horizontal circular plane.

At its bottom end the inner casing 13 is provided with an inwardly flanged bottom ring 19, of substantially L-shape in radial section, the inner flange thereof having a depressed shoulder 21 therein for a purpose to be hereinafter set forth. Any suitable or desired means for securing the depending flange of the top ring 17 and the upwardly extending flange of the bottom ring 19 to the top and the bottom edges of the inner casing 13 may be utilized, but I at present prefer to spot weld the top and the bottom ring respectively to the top and the bottom edges of the inner casing 13.

A substantially flat or plane metal-encased electric heating element 23 is adapted to be supported by the bottom ring 19 and, as shown, includes an outer peripheral flange portion 25 which is of such diametral dimension that it will fit loosely within the annular shoulder 21 so that the weight of the heating element will be supported by the bottom ring 19. Any desired kind of heating element may be utilized but at present, I prefer to use a metal encased heating element having a plurality of arcuate grooves therein in which are located a heating resistor suitably electrically insulated from the outer metal casing. As shown in Fig. 2 of the drawings, I provide a plurality of terminal members 27 and 29 for two separate heating units in order that the same may be connected either in parallel or in series to an energizing circuit, or so that only one heating element may be thus connected, to provide a plurality of different heat inputs, in a manner well known in the art. In general, these terminal structures include depending terminal studs 31 properly insulated from the metal of the electric heating unit 23.

I provide one or more sheets 33 of heat-insulating material, such as asbestos, which extend substantially but not entirely around the periphery of the inner casing, as will be noted more particularly by reference to Fig. 4 of the drawings at the bottom portion of the view there presented. An outer resilient thin-metal casing 35 is located around the inner casing and the layers of heat-insulating material and also has an open top and an open bottom. Attention is called particularly to an axially extending inwardly indented portion 37 which is of such radial depth that it engages the outer surface of the enlarged portion 15 at the top of the inner casing 13, and the inwardly turned flange of the ring 19 at the bottom of casing 13, as will be seen by reference to Fig. 1 of the drawings at that part thereof located immediately above a terminal structure to be hereinafter described. The design and construction of this outer casing 35 is such that that part thereof located diametrically opposite the indented portion 37 will be forced tightly against the layer or layers of heat-insulating material so that the heat-insulating material will be pressed tightly against the inner casing at that point, but will be more or less free therefrom at substantially all of the other peripheral portions thereof in order to provide a somewhat better heat insulating effect than would be obtained if the entire peripheral portions thereof were to be tightly pressed against the inner casing.

Immediately below the bottom plane surface of the heating element 23 I locate heat insulating material 38 which may also be of sheet asbestos, and I then locate thereagainst a bottom cover member or plate 39, which, as will be noted by reference particularly to Fig. 1 of the drawings, is of dished shape with its upwardly extending outer flange 41 closely surrounding and engaging a reduced bottom portion 43 of the outer casing 35 whereby the upper edge or rim of flange 41 is, to a large extent, protected. I provide also a pair of bolts or studs 45 suitably secured to the heating element 23 as by having their upper ends welded thereagainst, which bolts or studs extend through suitable openings in the bottom cover plate 39, nuts 47 being screwed on the studs 45 whereby not only to draw the heating element 23 downwardly against its seat in the annular shoulder 21, but also at the same time to draw the bottom cover plate upwardly into the position substantially as shown in Fig. 1 of the drawings. If desired, loose heat insulating material 49, such as mineral wool, may be provided in that part of the dished bottom cover not filled by the heat insulating material 38.

A terminal structure for the heating element comprises an elongated horizontally-extending block 51 which may be made of refractory material and which may have an inner arcuate surface 53, as shown in Figs. 2 and 4 of the drawings to fit closely against the outer surface of the outer casing 35 at the indented portion 37 thereof. A plurality of terminal leads 55, 57 and 59 extend from the terminal members 27 and 29 to terminal straps 61 loosely mounted in and supported by the block 51. A thin layer or small sheet of mica 63 is located beneath the bottom end portions of terminal straps 61 in order to insulate them from a supporting plate 65 which, as will be seen more particularly from Figs. 1 and 5 of the drawings, includes a substantially flat plate having a radially outwardly extending portion as well as a radially inwardly extending portion, these terms to be understood as referring to the adjacent bottom edge of the outer case 35. The supporting plate 65 is provided also with a pair of vertically-extending lugs 67 which are located against and suitably secured to the outer casing 35, as by welding the two together. This supports the horizontal portion of plate 65 closely adjacent to the bottom edge of outer casing 35, as will be seen more particularly by reference to Fig. 1 of the drawings. The bottom cover 39 has a part of the flange 41 removed therefrom immediately adjacent to the terminal block 51 and reference to Fig. 1 of the drawings will show that the radially extending flange portion, designated by numeral 69 in Fig. 1 of the drawings, is located closely against the plate 65 to thereby assist in steadying the same when in use. The block 51 is clamped against the plate 65 as by a plurality of bolts 71, each having a nut thereon in a manner well known in the art.

The parts hereinbefore described are those more particularly constituting and embodying my invention and as has already been stated above are adapted to be held in a substantially fixed position in some supporting structure such as the stove top of an electric range, so that only the top portion of the cooking device will be visible above the stove top. A cooking pot 73 is adapted to be located within the inner casing and to rest directly upon the heating element 23 to be heated, therefore, not only by heat conducted to the bottom portion thereof but also by heat radiated from the metal encased heating element which, it may be noted is so designed and constructed as to be operable at relatively high temperatures and to thereby raise the temperature of any food placed in the cooking pot 73 to the desired temperature in a relatively short time. A heat-insulated removable cover 75 is provided for the pot 73 which may be removed by handle 77, the cooking pot 73 being provided with a pair of bails or handles 79. The cooking pot and its cover do not constitute a part of my invention and are shown for illustrative purposes only.

The device embodying my invention thus provides a relatively simple, compact and easily assembled cooking appliance having a relatively small number of parts and providing heat insulation not only around the periphery of the device, but also at its bottom end adapted to receive a removable cooking pot whose top portion is provided with heat insulation so that in effect substantially all of the superficial area of the assembly is heat insulated.

Various modifications may be made in the device embodying my invention without departing from the spirit and scope thereof, and I desire, therefore, that only such limitations shall be placed thereon as are imposed by the prior art or are set forth in the appended claims.

I claim as my invention:

1. An electric cooking device, comprising in combination, an inner open-top-and-bottom casing, a bottom ring for the inner casing secured thereto at its lower edge and having an inwardly extending flange with a central depressed shoulder, a substantially flat electric heating element supported by its outer periphery on the central depressed shoulder of the bottom ring and having a thicker central portion extending above the plane of said flange, a bottom closure plate and a clamping bolt secured to the heating element and extending through the bottom closure plate and cooperating therewith to hold the heating element in said depressed shoulder.

2. An electric cooking device, comprising in combination, an inner casing, heat insulating material extending less than 360° peripherally around the outside of the casing, and a resilient outer casing having an axially-extending radially-indented portion engaging the inner casing to hold the outer casing in its proper operative position.

3. An electric cooking device comprising in combination, an inner sheet metal casing, heat-insulating material located against the outside of the inner casing except in one area and a cylindrical resilient sheet metal outer casing surrounding the heat-insulating material and having an axially-extending radially-indented portion opposite said area.

4. An electric cooking device comprising in combination, an inner thin metal casing, a layer of heat-insulating material extending around the inner casing slightly less than 360°, and an outer casing of thin resilient metal on the outside of the heat insulating material, having an axially and radially-inwardly extending dent located at the gap in the heat-insulating material to cause the outer casing to resiliently clamp the layer of heat insulating material against the inner casing and to hold the outer casing in its proper operative position.

ALFONS BARNSTEINER.